US007675898B2

(12) United States Patent
Shimonishi et al.

(10) Patent No.: US 7,675,898 B2
(45) Date of Patent: Mar. 9, 2010

(54) SESSION RELAY APPARATUS FOR RELAYING DATA, AND A DATA RELAYING METHOD

(75) Inventors: Hideyuki Shimonishi, Minato-ku (JP);
Tutomu Murase, Minato-ku (JP);
Yasuhiro Yamasaki, Minato-ku (JP);
Yohei Hasegawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 1018 days.

(21) Appl. No.: 10/568,440

(22) PCT Filed: Jul. 26, 2004

(86) PCT No.: PCT/JP2004/010604

§ 371 (c)(1),
(2), (4) Date: Feb. 14, 2006

(87) PCT Pub. No.: WO2005/020523

PCT Pub. Date: Mar. 3, 2005

(65) Prior Publication Data

US 2007/0058534 A1    Mar. 15, 2007

(30) Foreign Application Priority Data

Aug. 20, 2003  (JP) .............................. 2003-295758

(51) Int. Cl.
*H04L 12/28* (2006.01)
(52) U.S. Cl. ...................................... 370/351; 370/389
(58) Field of Classification Search ................. 370/351, 370/389, 395.1, 395.4, 395.41; 455/403, 455/422.1, 450, 452, 452.2
See application file for complete search history.

(56) References Cited

U.S. PATENT DOCUMENTS 6,092,115 A    7/2000    Choudhury et al.

(Continued)

FOREIGN PATENT DOCUMENTS

JP    8-88642 A    4/1996

(Continued)

OTHER PUBLICATIONS

A. Bakre and B. R. Badrinath; "I-TCP: Indirect TCP for Mobile Host"; Department of Computer Science, Rutgers University; DSC-TR-314; Oct. 1994; (http://www.it.iibt.ac.in/it644/papers/i-tcp.pdf).

(Continued)

*Primary Examiner*—Chi H Pham
*Assistant Examiner*—Fan Ng
(74) *Attorney, Agent, or Firm*—Sughrue Mion, PLLC

(57) ABSTRACT

A session identification unit (11) determines a session to which an incoming packet belongs, while a session relay unit (12-1-12-N) relays between a session with a transmission terminal and a session with a reception terminal. A packet scheduler (13) instructs and controls the delivery of packets from each session relay unit (12-1-12-N), and a delivery control unit (14) delivers packets from each session relay unit (12-1-12-N) based on the instruction. In the session relay unit (12-1), a transmission session processing unit (121-1) processes a session for transmitting data to the reception terminal, and a transmission buffer (122-1) stores received data until the end of a transmission. A reception session processing unit (123-1) processes a session for receiving data from the transmission terminal.

14 Claims, 13 Drawing Sheets

U.S. PATENT DOCUMENTS

| | | | |
|---|---|---|---|
| 6,990,073 B1 * | 1/2006 | Sandoval | 370/232 |
| 2002/0080721 A1 * | 6/2002 | Tobagi et al. | 370/236 |

FOREIGN PATENT DOCUMENTS

| | | |
|---|---|---|
| JP | 10-126446 A | 5/1998 |
| JP | 10-233802 A | 9/1998 |
| JP | 11-32078 A | 2/1999 |
| JP | 11-112576 A | 4/1999 |
| JP | 11-252179 A | 9/1999 |
| JP | 2000-49787 A | 2/2000 |
| JP | 2000-49856 A | 2/2000 |
| JP | 2000-174818 A | 6/2000 |
| JP | 3163479 B2 | 3/2001 |
| JP | 2001-203697 A | 7/2001 |
| JP | 2001-358757 A | 12/2001 |
| JP | 2001-358771 A | 12/2001 |
| JP | 2002-185494 A | 6/2002 |
| JP | 2002-217958 A | 8/2002 |
| JP | 2002-271380 A | 9/2002 |
| JP | 2002-281104 A | 9/2002 |
| JP | 2002-290451 A | 10/2002 |
| JP | 2002-312261 A | 10/2002 |
| JP | 2002-344500 A | 11/2002 |

OTHER PUBLICATIONS

A. Aggarwal, S. Savage, and T. Anderson; "Understanding the Performance of TCP Pacing"; Department of Computer Science and Engineering, University of Washington; Proceedings of IEEE INFOCOM' 2000.

W. R. Stevens; TCP/IP Illustrated: The Protocols; Chapter 21: TCP Timeout and Retransmission; 1994; pp. 297-317.

Masayoshi Kobayashi, et al. "Koritsuteki Na Prefetch O Okonau Pro Active Cash Network Kose," Shingaku Giho IN2000-150, Nov. 22, 2000, p. 106, 4.3 to p. 107, 5.2, Fig. 4.

Teruyuki Hasegawa et al., Implementation of TCP Gateway for LAN Interconnection through Wide Area ATM Network, Technical Report of IEICE, Sep. 29, 1995, vol. 95 No. 267, The Institute of Electronics, Information and Communication Engineers, Tokyo, Japan.

* cited by examiner

SESSION RELAY APPARATUS FOR RELAYING DATA, AND A DATA RELAYING METHOD

This application claims priority from PCT Application No. PCT/JP2004/010604 filed Jul. 26, 2004 and from Japanese Application No. 2003-295758 filed Aug. 20, 2003, which applications are incorporated herein by reference.

TECHNICAL FIELD

The present invention relates to a session relay apparatus and a session relaying method used therefor, and more particularly, to an apparatus for relaying data during a TCP (Transmission Control Protocol) session.

BACKGROUND ART

Generally, in communication applications, a communication session is established between a transmission terminal and a reception terminal, and communication is made on the established session. However, when a propagation delay time is very long between the transmission terminal and the reception terminal, or when communication is made across networks which differ in characteristics such as wired and wireless ones, the communication throughput degrades between the transmission terminal and the reception terminal.

As methods for solving this problem, there exist systems as disclosed in the following Documents 1-3. In this system, instead of making communication between a transmission terminal and a reception terminal in a single session, a relay apparatus is installed between the transmission terminal and the reception terminal. Then, communication is made by relaying data in two sessions, i.e., a session from the transmission terminal to the relay apparatus and a session from the relay apparatus to the reception terminal.

Document 1: JP-A-11-252179

Document 2: JP-A-2002-281104

Document 3: Bakre and B. R. Badrinath, "I-TCP; Indirect TCP for Mobile Host", Department of Computer Science Rutgers University, DSC-TR-314, 1994 (http://www.it.iibt.a-c.in/it644/papers/i-tcp.pdf)

A relay apparatus that has a large transmission buffer in order to prevent the throughput from degrading even if a propagation delay time is very long is known to be effective. However, when a large transmission buffer is contained, packets are delivered in a burst manner particularly when the TCP session starts slowly which causes congestion on a network, resulting in a lower throughput.

As a method for solving such a problem, there is a method which adjusts intervals at which packets are delivered in such a manner that the packets are not delivered in a burst manner from a TCP session, as disclosed in the following Document 4:

Document 4: A. Aagarwal, S. Savage, and T. Anderson, "Understanding the Performance of TCP Pacing", in proceedings of IEEE INFOCOM' 2000

Also, as another method, output packets from a TCP session are placed in a queue and controlled to be delivered by a scheduler, thereby making it possible to deliver packets in an arbitrary bandwidth, to limit the throughput of another TCP session, and to improve the throughput of a particular session as well.

For relaying a session, the most frequent problem is that a processing load is generally high in processing of the TCP session so that fast relay processing is difficult. Also, when an adjustment is made for a packet delivery interval from the TCP session, the processing load becomes even higher.

As a system for speeding up the processing of the TCP session, there exist systems as described below. As a first system, there is a system for reducing the processing load on a relay apparatus by using a zero copy method for data transfer between the kernel of OS (Operating System) and an application program. In this first system, when data is passed between a kernel program for actually performing data transmission/reception processing and an application program for performing data relay processing, virtual data movement is performed through page mapping without performing a physical data copy.

As a second system, there is a system which only conducts retransmission control when relay processing is performed. In this second system, a session is not terminated in a relay apparatus, but one session is set between a transmitting and a reception terminal. Then, in the relay apparatus, when a packet received from the transmission terminal is delivered to the reception terminal, the packet is not only transferred, but is also saved in the relay apparatus.

The relay apparatus monitors an ACK (acknowledgement) packet returned from the reception terminal to the transmission terminal, delivers the saved packet to the reception terminal upon detection of a discarded packet between the relay apparatus and the reception terminal, to prevent a retransmission of the packet from the transmission terminal and to prevent a lower throughput between the transmission terminal and the reception terminal due to the discarded packet.

In this second system, relay processing is not performed between sessions, the retransmission processing alone is performed, so that the load on the relay apparatus can be reduced, as compared with the case where relay processing is performed.

As a third system, there is a system which performs relay processing only for a session which requires a relay, without performing the relay processing for a session which does not require a relay, thereby reducing the processing load on a relay apparatus. For example, as an illustration of this system, there is a system which measures the throughput of a session, and performs the relay processing only for selected sessions which allow for an improved throughput, if the relay processing is performed therefor, as described in the following Document 5.

Document 5: JP-A-11-112576

Also, as the aforementioned system, there is a system which does not perform relay processing when an HTTP (Hyper Text Transfer Protocol) request is transmitted, but performs the relay processing only when data is transferred, as disclosed in the following Document 6.

Document 6: JP-A-2002-312261

In the aforementioned conventional session relay systems, the first system has the problem that the processing load is also high besides the data copies. When delivery control is conducted in accordance with a TCP pacing system or a scheduler, a load for packet delivery control is added, in addition, to a TCP processing load, resulting in a higher overall processing load.

Also, when relay processing is performed for an upper layer protocol such as, for example, iSCSI (internet Small Computer System Interface), as well as for a relay of TCP sessions, packet delivery control is further added on the basis of congestion control on an upper layer, resulting in a yet higher processing load. Particularly, when there are a large number of sessions to be relayed, a higher processing load is required for conducting delivery control for packets between sessions.

Further, in conventional session relay systems, the first system has a problem in that the packet length is limited. To move virtual data between a TCP layer and an application in accordance with page mapping, the page size of a CPU (central processing unit) must match the packet length.

Generally, a session relay apparatus exists independently of transmitting and reception terminals, and the packet length cannot be previously assumed for use by the transmission terminals and reception terminals, so that no reduction in processing load can be expected by eliminating copies for those transmission and reception terminals which employ a packet length different from the page size of a bandwidth control apparatus.

On the other hand, in the conventional session relay systems, the second system has a problem in that it cannot improve a reduction in the throughput due to factors other than discarded packets. When session relay processing is performed, the session relay apparatus immediately returns an ACK packet to a transmission terminal in response to packets received from the transmission terminal, that area intended for confirming the reception. However, in this second system, a reception terminal simply returns an ACK packet to a transmission terminal, whereas the session relay apparatus itself does not return an ACK packet. For this reason, the second system provides a smaller throughput improving effect in an environment in which a propagation delay is large.

Also, in the conventional session relay systems, the third system has a problem in that the processing load is not reduced when there are a large number of sessions which must be relayed.

DISCLOSURE OF THE INVENTION

It is therefore an object of the present invention to provide a session relay apparatus which is capable of solving the problems mentioned above and performing relay processing between sessions at high speeds even when there are a large number of sessions to be relayed, and packet delivery control is conducted, and a session relaying method used therefor.

A session relay apparatus according to the present invention is a session relay apparatus for performing session relay processing including congestion control processing and packet delivery control processing on a plurality of layers, wherein each of the plurality of layers only creates the congestion control information, and the packet delivery control processing is concentrated in a scheduler on an IP (Internet Protocol) layer.

Another session relay apparatus according to the present invention is a session relay apparatus for realizing communication between a reception terminal and a transmission terminal by relaying data between a session to the transmission terminal and a session to the reception terminal, comprising:

reception session processing means for receiving data from the session to the transmission terminal, transmission session processing means for transmitting data to the session to the reception terminal, transmission buffer for temporarily storing data delivered to the transmission terminal, a packet scheduler for controlling a packet delivery from the transmission buffer, and delivery control means for controlling the delivery of data stored in the transmission buffer in response to the control of the packet scheduler, wherein the transmission session processing means calculates the amount of data which is permitted to be delivered on the layer, and the packet scheduler controls the packet delivery based thereon.

Another session relay apparatus according to the present invention is a session relay apparatus for realizing communication between a transmission terminal and a reception terminal by relaying data between a session to the transmission terminal and a session to the reception terminal, comprising:

reception session processing means provided in correspondence to a plurality of layers for receiving data from the session to the transmission terminal, transmission session processing means provided in correspondence with the plurality of layers for transmitting data to the session to the reception terminal, a transmission buffer for temporarily storing data delivered to the transmission terminal, and a packet scheduler for controlling the delivery of packets from the transmission buffer, wherein each of the transmission session control means calculates the amount of data permitted to be delivered on an associated layer, and the packet scheduler controls the packet delivery based on the amount of data permitted in common on all of the plurality of layers.

A session relaying method according to the present invention is a session relaying method for a session relay apparatus for performing session relay processing including congestion control processing and packet delivery control processing on a plurality of layers, wherein each of the plurality of layers only creates congestion control information, and the packet delivery control processing is concentrated in a scheduler on an IP (Internet Protocol) layer.

Another session relaying method according to the present invention is a session relaying method for a session relay apparatus for realizing communication between a reception terminal and a transmission terminal by relaying data between a session to the transmission terminal and a session to the reception terminal, comprising, on the session relay apparatus side, reception session processing of receiving data from the session to the transmission terminal, transmission session processing for transmitting data to the session to the reception terminal, processing for temporarily storing data delivered to the transmission terminal in a transmission buffer, processing for controlling a packet delivery from the transmission buffer in a packet scheduler, and processing for controlling the delivery of data stored in the transmission buffer in response to the control of the packet scheduler in delivery control means, wherein the transmission session processing calculates the amount of data which is permitted to be delivered on the layer, and the packet scheduler controls the packet delivery based thereon.

Another session relaying method according to the present invention is a session relaying method for a session relay apparatus for realizing communication between a transmission terminal and a reception terminal by relaying data between a session to the transmission terminal and a session to the reception terminal, comprising on the session relay apparatus side, reception session processing for receiving data from the session to the transmission terminal in each of the plurality of layers, transmission session processing for transmitting data to the session to the reception terminal in each of the plurality of layers, processing for temporarily storing data delivered to the transmission terminal in a transmission buffer, and processing for controlling the delivery of packets from the transmission buffer in a packet scheduler, wherein each of the transmission session control processing calculates the amount of transmission permitted data on an associated layer, and the packet scheduler controls the packet delivery based on the amount of data permitted in common on all of the plurality of layers.

Specifically, the session relay apparatus of the present invention does not control the packet delivery on the TCP (Transmission Control Protocol) layer, but only generates control information for the packet delivery on the TCP layer, and controls the packet delivery using the packet scheduler on the IP (Internet Protocol) layer.

Also, in the session relay apparatus of the present invention, control information alone is created on an higher-rank layer even in regard to congestion control in a higher-rank layer protocol such as iSCSI (internet Small Computer System Interface), and uses the packet scheduler on the IP layer for actual packet delivery control.

In this way, in the session relay apparatus of the present invention, since the data delivery control on a plurality of layers can be integrated, it is possible to reduce the processing load relating to the packet delivery.

Further, in the session relay apparatus of the present invention, since no data is copied to an application, there is no need for movements of data involved in page mapping. Specifically, a received packet is directly stored in the transmission buffer of the IP layer without being stored in a reception buffer of the TCP layer or other higher-rank layers, or an application or without being stored in a transmission buffer of the TCP layer or other higher-rank layers, or an application. For this reason, in the session relay apparatus of the present invention, no data movement occurs within the session relay apparatus, so that there is no need for movement of data involved in page mapping.

Furthermore, in the session relay apparatus of the present invention, since the relay processing is not performed only for packet retransmission control, but a session is once completely terminated to perform complete relay processing, it is possible to improve a degraded throughput due to factors other than discarded packets.

In the session relay apparatus of the present invention, the relay processing between sessions can be performed at higher speeds, so that even when there is a large number of sessions to be relayed, the processing can be performed at high speeds.

BEST MODE FOR CARRYING OUT THE INVENTION

Next, embodiments of the present invention will be described with reference to the drawings.

First Embodiment

Figure 1:
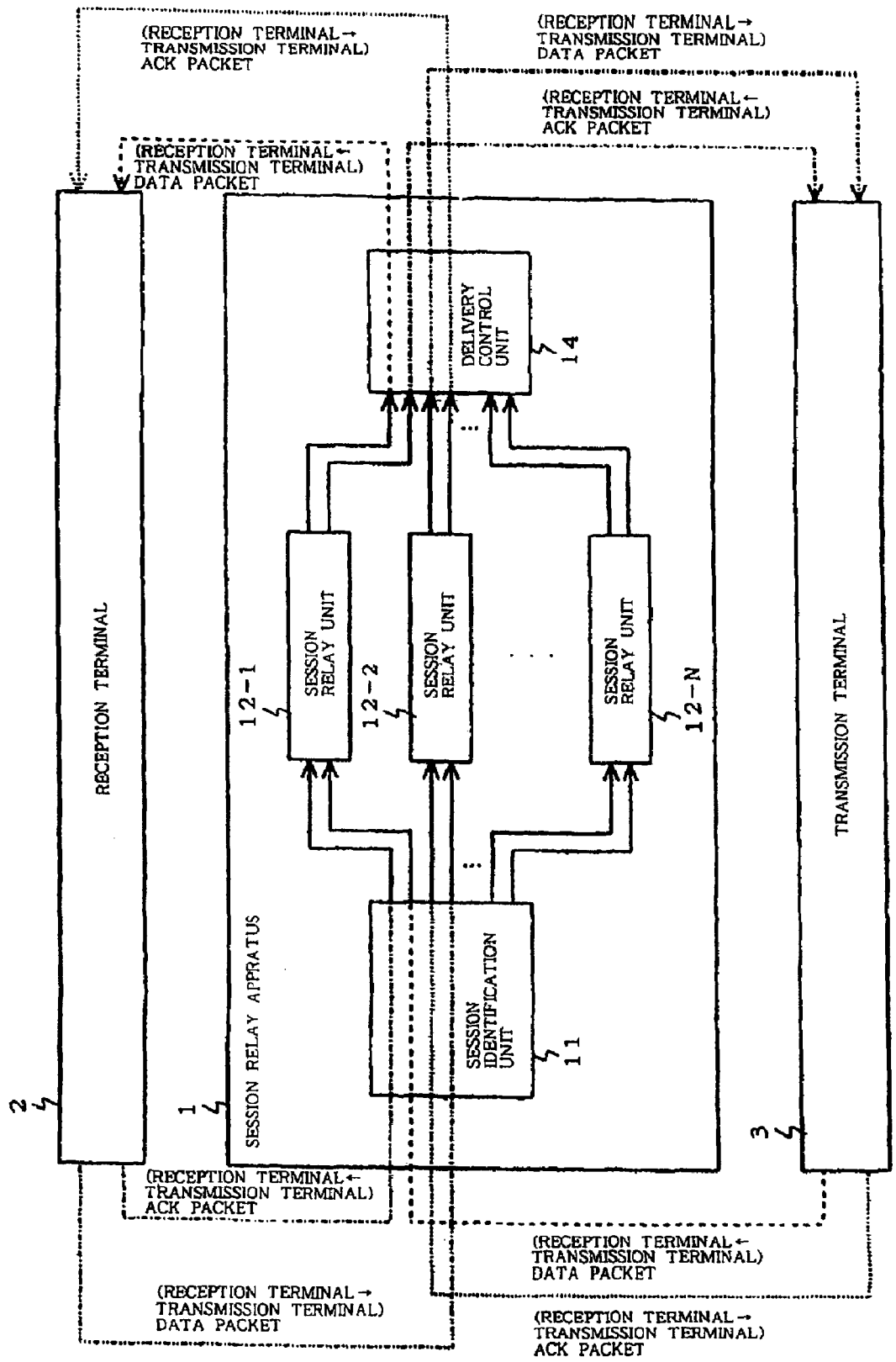
FIG. 1 is a block diagram illustrating the configuration of a transmission system which includes a session relay apparatus according to a first embodiment of the present invention.

FIG. 1 is a block diagram illustrating the configuration of a transmission system which includes session relay apparatus 1 according to a first embodiment of the present invention. In FIG. 1, session relay apparatus 1 according to this embodiment comprises session identification unit 11, session relay units 12-1-12-N, and delivery control unit 14, and is connected to reception terminal 2 and transmission terminal 3.

First, when data is sent from transmission terminal 3 to reception terminal 2, a data packet from transmission terminal 3 is processed by a reception session processing unit (not shown) of session relay unit 12-1, and as a result, an ACK (acknowledgement) packet is returned to transmission terminal 3.

Data received by the reception session processing unit of session relay unit 12-1 is sent to a transmission session processing unit (not shown) of session relay unit 12-1, and a data packet is transmitted from here to reception terminal 2. On the other hand, the ACK packet returned by reception terminal 2 is processed by the transmission session processing unit of session relay unit 12-1.

Likewise, when data is sent from reception terminal 2 to transmission terminal 3, a data packet from reception terminal 2 is processed by a reception session processing unit (not shown) of session relay unit 12-2, and as a result, an ACK packet is returned to reception terminal 2.

The data received by the reception session processing unit of session relay unit 12-2 is sent to a transmission session processing unit (not shown) of session relay unit 12-2, and a data packet is transmitted from here to transmission terminal 3. On the other hand, the ACK packet returned by transmission terminal 3 is processed by the transmission session processing unit (not shown) of session relay unit 12-2.

Figure 2:
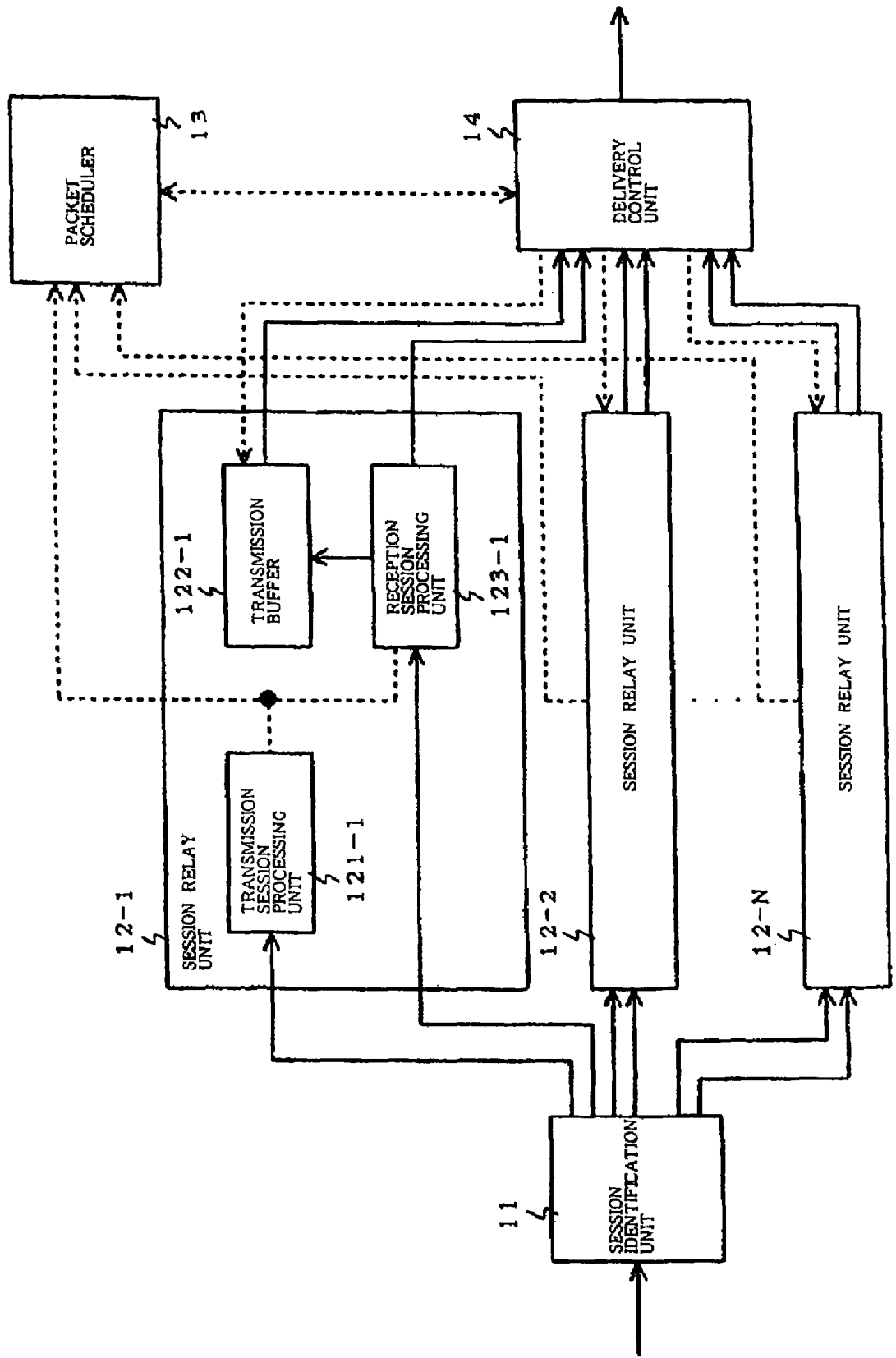
FIG. 2 is a block diagram illustrating the configuration of the session relay apparatus according to the first embodiment of the present invention.

FIG. 2 is a block diagram illustrating the configuration of the session relay apparatus according to the first embodiment of the present invention. In FIG. 2, session relay apparatus 1 comprises session identification unit 11, session relay units 12-1-12-N, packet scheduler 13, and delivery control unit 14.

Session identification unit 11 determines a session to which an incoming packet belongs. Session relay unit 12-1-12-N relays packets between a session with transmission terminal 3 and a session with reception terminal 2. Packet scheduler 13 controls packets outputs from each of session relay units 12-1-12-N. Delivery control unit 14 delivers packets from each session relay unit 12-1-12-N based on instructions from packet scheduler 13.

Session relay unit 12-1 in turn comprises transmission session processing unit 121-1 for processing a session to transmit data to reception terminal 2; transmission buffer 122-1 for storing received data until the end of a transmission; and reception session processing unit 123-1 for processing a session to receive data from transmission terminal 3. Though not shown, the configuration of session relay units 12-2-12-N is the same as the configuration of session relay unit 12-1 described above.

Figure 3:
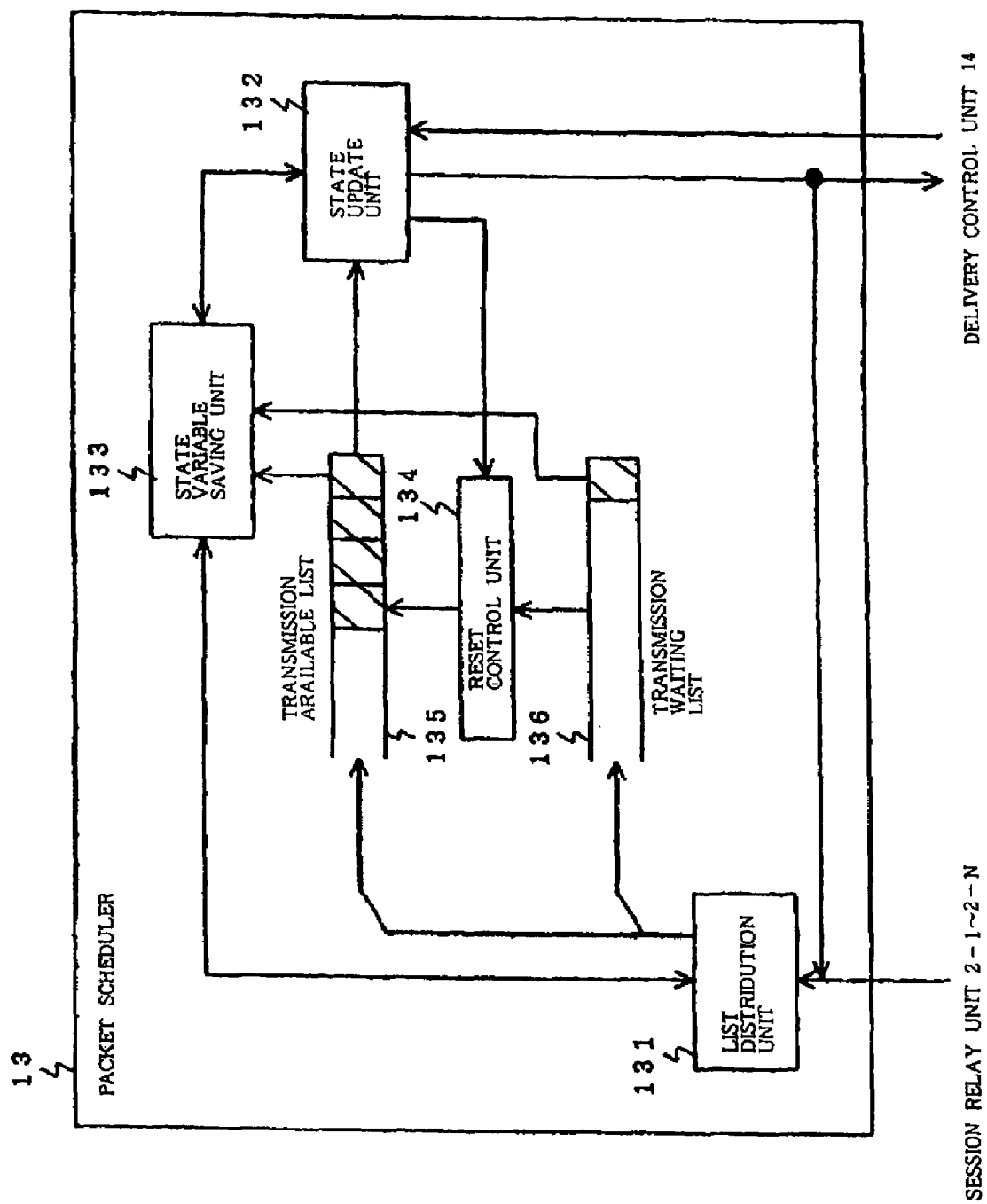
FIG. 3 is a block diagram illustrating the configuration of a packet scheduler in FIG. 2.

FIG. 3 is a block diagram illustrating the configuration of packet scheduler 13 in FIG. 2. In FIG. 3, packet scheduler 13 comprises list distribution unit 131, state update unit 132, state variable saving unit 133, reset control unit 134, transmission available list 135, and transmission waiting list 136.

Transmission available list 135 holds identifiers of sessions in which packets can be delivered, while transmission waiting list 136 holds identifiers of sessions which are waiting for transmission. List distribution unit 13 distributes an identifier of a data packet session or an identifier of a session for which an ACK packet has been received to transmission available list 135 or to transmission waiting list 136.

State update unit 132 retrieves the identifier of a session from transmission available list 135 for notification to delivery control unit 14, and updates the state of the session. State variable saving unit 133 holds the state of each session, while reset control unit 134 moves the identifier of a session managed by transmission waiting list 136 to transmission available list 135.

In a TCP (Transmission Control Protocol) session, bidirectional communications are generally made between transmission terminal 3 and reception terminal 2. Thus, assume in this embodiment that two session relay units are used for a set of transmission terminal 3 and reception terminal 2, and corresponding session relay units are used respectively for data communications in the respective directions.

Therefore, session relay units 12-1-12-N are provided two by two for a plurality of sets of transmission terminals 3 and reception terminals 2, and each of session relay units 12-1-12-N performs processing for relaying data from a session of transmission terminal 3 to a session of corresponding reception terminal 2, or from a session of reception terminal 2 to a session of corresponding transmission terminal 3.

In the TCP session, a data packet in a certain direction and an ACK packet in a direction opposite thereto can be integrated onto a single packet (piggy back of ACK), but a description on such an operation is omitted in this embodiment to simplify the description.

Figure 4:
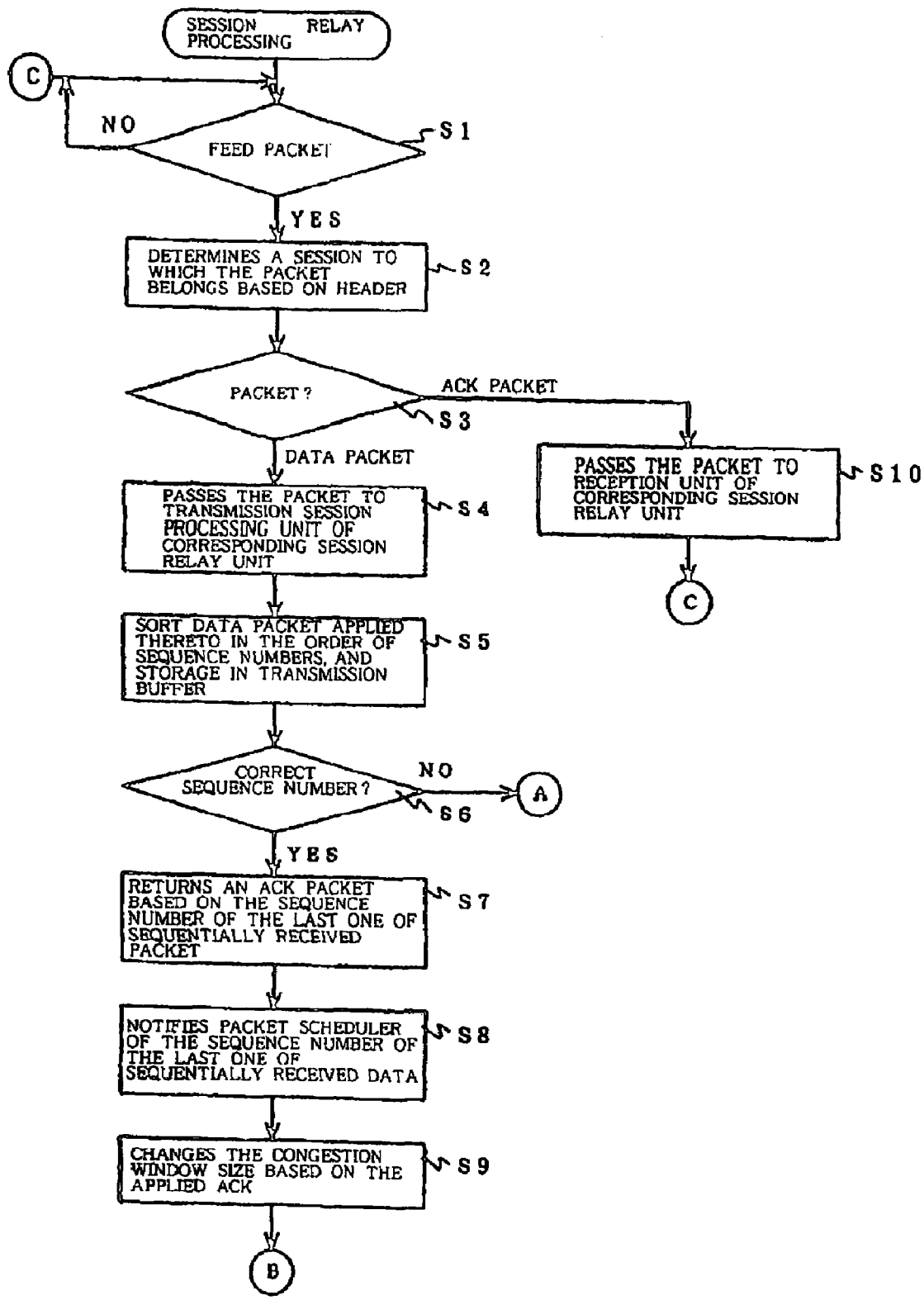
FIG. 4 is a flow chart illustrating the operation of the session relay apparatus according to the first embodiment of the present invention.
Figure 5:
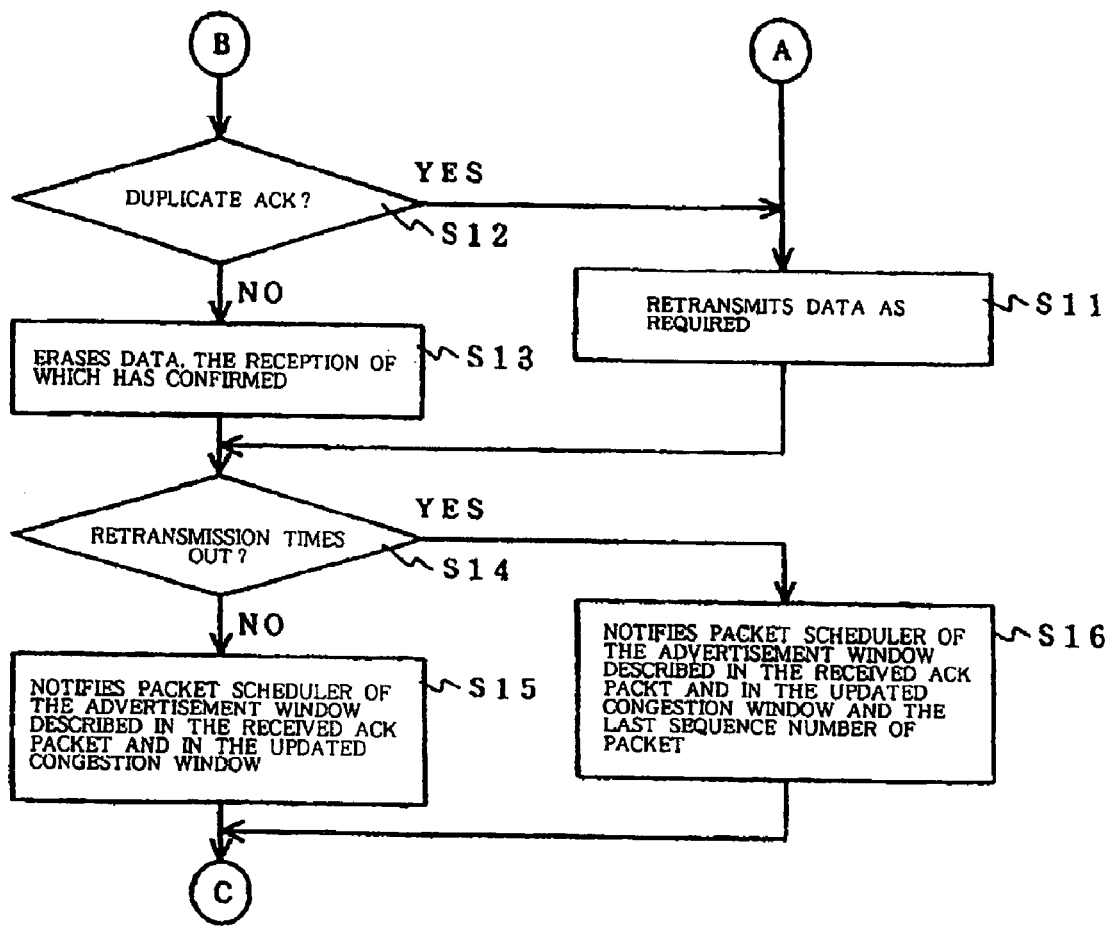
FIG. 5 is a flow chart illustrating the operation of the session relay apparatus according to the first embodiment of the present invention.
Figure 6:
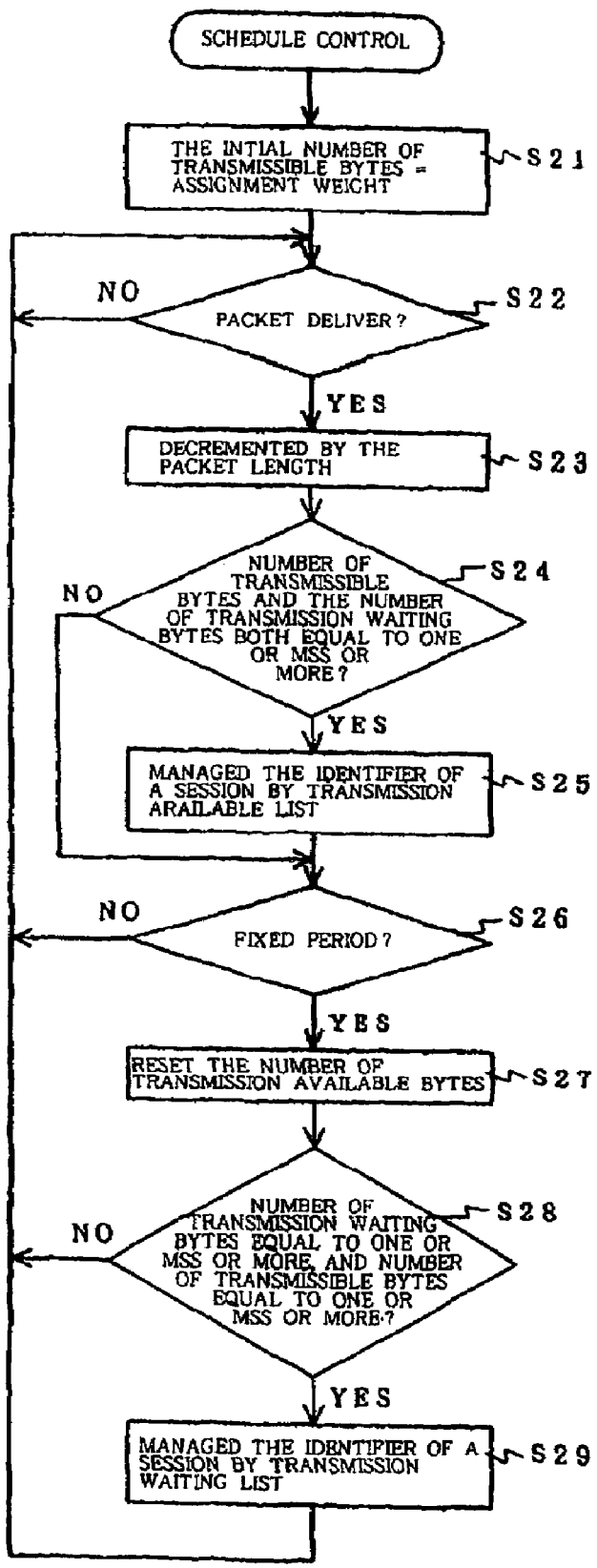
FIG. 6 is a flow chart illustrating the operation of the packet scheduler illustrated in FIG. 3.

FIGS. 4 and 5 are flow charts Illustrating the operation of session relay apparatus 1 according to the first embodiment of the present invention, and FIG. 6 is a flow chart illustrating the operation of packet scheduler 13 illustrated in FIG. 3. The operation of session relay apparatus 1 according to the first embodiment of the present invention will be described with reference to these FIGS. 1-6.

When a packet is fed to session relay apparatus 1 according to this embodiment (step S1 in FIG. 4), session identification unit 11 references a header of the packet, and determines a session to which the packet belongs, based on a source IP (Internet Protocol) address, a destination IP address, a fourth-layer protocol number, a source fourth-layer port number, a destination fourth-layer port number, and the like (step S2 in FIG. 4).

When the packet is a data packet (step S3 in FIG. 4), session identification unit 11 passes the packet to reception session processing unit 123-1-123-N of corresponding session relay unit 12-1-12-N (reception session processing units 123-2-123-N are not shown) (step S4 in FIG. 4).

On the other hand, when the packet is an ACK packet (step S3 in FIG. 4), session identification unit 11 passes the packet to transmission session processing unit 121-1-121-N of corresponding session relay unit 12-1-12-N (transmission session processing units 121-2-121-N are not shown) (step S10 in FIG. 4).

Reception session processing unit 123-1-123-N sorts data packets applied thereto in the order of sequence numbers for storage in transmission buffer 122-1-122-N (transmission buffers 122-2-122-N are not shown) (step S5 in FIG. 4). Also, when a received data packet has a correct sequence number (step S6 in FIG. 4), i.e., when the sequence number is continuous to the sequence number at the end of data which have been previously received in sequence, reception session processing unit 123-1-123-N returns an ACK packet through delivery control unit 14 for notifying transmission terminal 3 of the acknowledgement of data reception and an advertisement window size (step S7 in FIG. 4).

Further, reception session processing unit 123-1-123-N returns an ACK packet (duplicate ACK packet) based on the sequence number of the last one of sequentially received packets, and notifies transmission terminal 3 of unarrival of packets.

Since the foregoing processing is described in detail in TCP/IP Illustrated, Volume 1: The Protocols, Addison-Wesley, 1994, ISBN 0-201-63346-9 (hereinafter called "Document 7"), a description thereon will not be made in detail.

After an ACK packet is generated, it is immediately delivered from delivery control unit 14, or stored in transmission buffer 122-1-122-N of the corresponding session in the opposite direction and delivered together with data packets for the session in the opposite direction in response to an instruction from packet scheduler 13.

Also, reception session processing unit 123-1-123-N notifies packet scheduler 13 of the sequence number of the last one of sequentially received data (step S8 in FIG. 4).

Transmission session processing unit 121-1-121-N changes the congestion window size based on the applied ACK packet (step S9 in FIG. 4), and erases data, the reception of which has been confirmed, from transmission buffer 122-1-122-N if the ACK packet is not a duplicate ACK (steps S12, S13 in FIG. 5), or retransmits data as required if it is a duplicate ACK (steps S12, S11 in FIG. 5). Since this processing is also described in detail in the aforementioned Document 7, a description thereon is not made in detail.

Transmission session processing unit 121-1-121-N notifies packet scheduler 13 of the advertisement window described in the received ACK packet and in the updated congestion window (step S15 in FIG. 5). Also, when a retransmission times out (step S14 in FIG. 5), transmission session processing unit 121-1-121-N also notifies the last sequence number of packets, the reception of which has been confirmed (step S16 in FIG. 5).

In this embodiment, packets are delivered only when the delivery of packets is instructed from packet scheduler 13, so that when a duplicate ACK is received, packets are not immediately retransmitted, but the sequence numbers of packets to be retransmitted are simply stored as packets to be delivered next.

The delivery of packet from transmission buffer 122-1-122-N is performed on the basis of an instruction from packet scheduler 13. When the delivery of packet is instructed from packet scheduler 13, delivery control unit 14 retrieves one packet from transmission buffer 122-1-122-N onto an outgoing line, and notifies packet scheduler 13 of the packet length of the delivered packet.

A packet delivered from transmission buffer 122-1-122-N is a packet, the sequence number of which has been stored for performing retransmission processing, or the packet having the smallest sequence number of untransmitted packets.

When a session of interest is not a TCP session, reception session processing unit 123-1-123-N simply stores received packets in transmission buffer 122-1-122-N in the order in which they have arrived. Transmission session processing unit 121-1-121-N does not receive the ACK packet but notifies packet scheduler 13 of the queue length of transmission buffer 122-1-122-N as the advertisement window and congestion window, thereby continuously requesting packet scheduler 13 to deliver packets as long as packets are stored in transmission buffer 122-1-122-N.

Packet scheduler 13 holds three parameters, an assignment weight, the number of transmissible bytes, and the number of transmission waiting, bytes in state variable saving unit 133 on a session-by-session basis.

The assignment weight is a weight assigned to the session. Packet scheduler 13 resets at a fixed period or each time there is no longer a session in which packets can be transmitted (steps S26, S27 in FIG. 6), and the number of bytes which can be transmitted during one reset period is the assignment weight.

The number of transmissible bytes is the number of bytes which can be transmitted from a current time to the next reset, and has an initial value equal to the assignment weight (step S21 in FIG. 6), and is decremented by the packet length each time a packet is delivered (steps S22, 23 in FIG. 6).

The number of transmission waiting bytes is a value derived by subtracting a sequence number already transmitted by packet scheduler 13 from a sequence number which is permitted by the TCP layer to be transmitted in the case of the TCP session, and represented by min(the sequence number of the last one of sequentially received data+1, the advertisement window indicated by the reception terminal, the congestion window of the session)−the transmitted sequence number. For the case other than the TCP session, the number of transmission waiting bytes is a queue length in transmission buffer 122-1-122-N.

Figure 7:
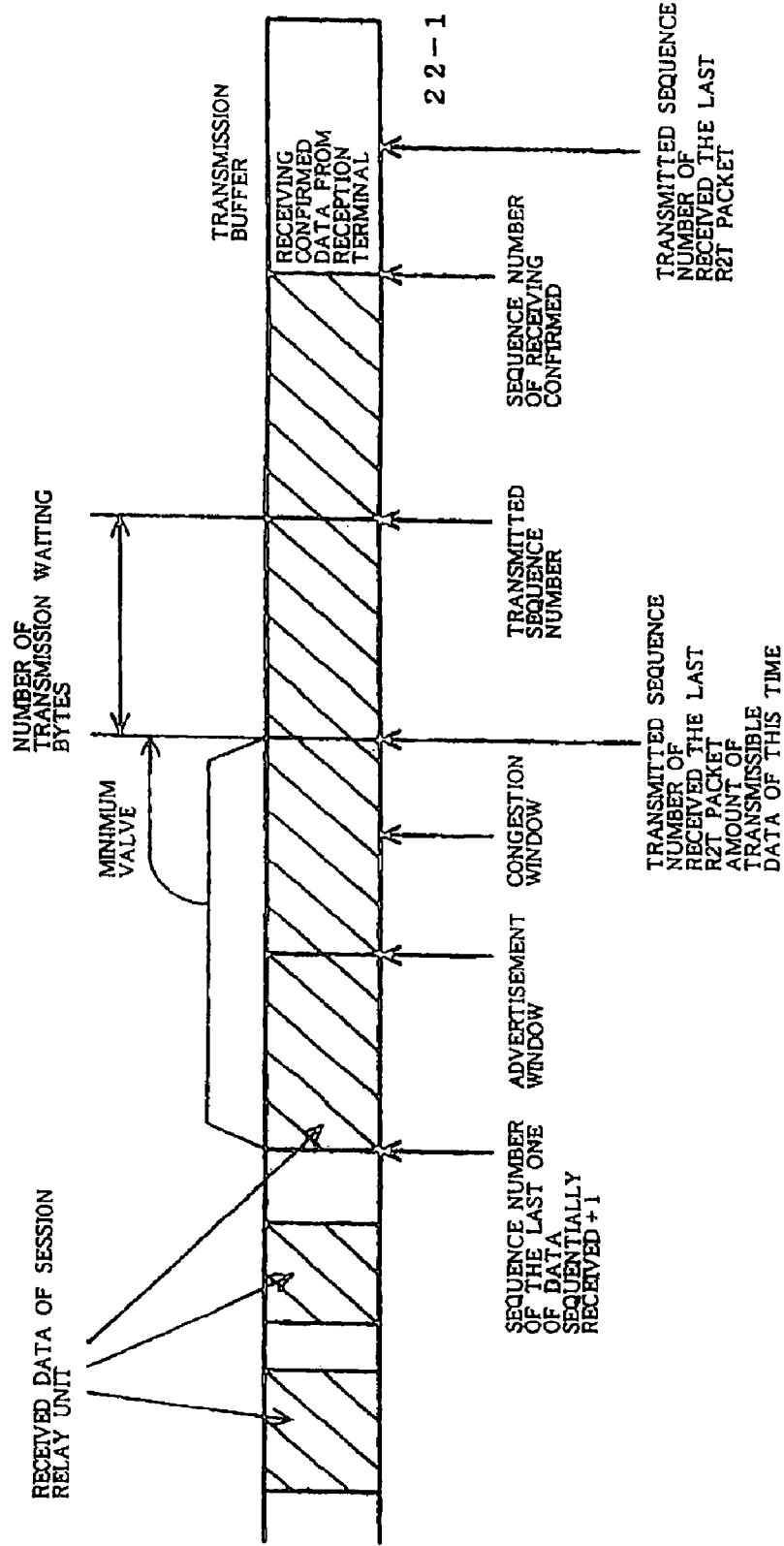
FIG. 7 is a schematic diagram showing the number of transmission waiting bytes.

FIG. 7 is a schematic diagram showing the number of transmission waiting bytes. In FIG. 7, the identifier of a session in which a packet can be delivered, i.e., a session which has the number of transmissible bytes and the number of transmission waiting bytes both equal to one or MSS (Maximum Segment Size) or more, is managed by transmission available list 135 (steps S24, S25 in FIG. 6), while the identifier of a session in which a packet can be delivered after the number of transmissible bytes is reset, i.e., a session which has the number of transmission waiting bytes equal to one or MSS or more but has the number of transmissible bytes equal to one or less than MSS, is managed by transmission waiting list 136 (steps S27-S29 in FIG. 6).

Next, the operation of packet scheduler 13 will be described with reference to FIG. 3. List distribution unit 131 updates the number of transmission waiting bytes in a manner shown in FIG. 7 when it receives the sequence number of the last one of packets sequentially received from transmission terminal 3, an advertisement window received from reception terminal 2, and an updated congestion window from session relay unit 12-1-12-N.

Also, when a retransmission timer times out in delivery control unit 14, list distribution unit 131 also returns a transmitted sequence number to a reception confirmed sequence number, and updates the number of transmission waiting bytes. When the number of transmission waiting bytes is one or less than MSS before the update, the identifier of the session is not managed by transmission available list 135 or transmission waiting list 136, so that list distribution unit 131 newly stores the identifier of the session in transmission available list 135 or transmission waiting list 136 based on the updated number of transmission waiting bytes and number of transmissible bytes.

State update unit 132 retrieves one identifier of a transmission available session from the top of transmission available list 135, and notifies delivery control unit 14 of this to deliver a packet. Subsequently, state update unit 132 adds the length of the delivered packet to the transmitted sequence number, and then updates the number of transmission waiting bytes, and subtracts the length of the delivered packet from the number of transmissible bytes.

State update unit 132 again stores the identifier of the session in transmission available list 135 or transmission waiting list 136 in accordance with the number of transmission waiting bytes and the number of transmissible bytes. Specifically, state update unit 132 stores the identifier in transmission available list 135 when the number of transmission waiting bytes and the number of transmissible bytes are both one or MSS or more, and stores the identifier in transmission waiting list 136 when the number of transmission waiting bytes is one or MSS or more but the number of transmissible bytes is one or less than MSS.

When transmission available list 135 becomes empty, state update unit 132 resets the numbers of transmissible bytes of all sessions, i.e., adds the assignment weight to the number of transmissible bytes. If the number of transmissible bytes is equal to or more than the assignment weight, the number of transmissible bytes is made equal to the value of the assignment weight [number of transmissible bytes=min(number of transmissible bytes+assignment weight, assignment weight)].

Since this processing causes all sessions in a transmission waiting state to change to a transmission available state, sessions managed by transmission waiting list 136 are all moved to transmission available list 135.

If the number of transmissible bytes is not one or less than MSS, and if there are data waiting for transmission in transmission buffer 122-1-122-N associated with the session before performing this reset processing, this is assumed to be a state in which there is a room in an output bandwidth from the session, but the transmission is stopped by the TCP control in transmission session processing unit 121-1-121-N.

In this event, in order to keep the bandwidth in preparation for a future resumption of transmission, even if the sum of the number of transmissible bytes and the assignment weight exceeds the assignment weight, the number of transmissible bytes is kept up to a certain value [number of transmissible bytes=min(number of transmissible bytes+assignment wait, upper limit value for number of transmissible bytes)].

As described above, in this embodiment, a relayed packet moves only when it is stored in transmission buffer 122-1-122-N upon reception and when it is retrieved from transmission buffer 122-1-122-N upon transmission, so that the data movement entails a small overhead. Also, since the packet delivery is controlled by packet scheduler 13 which uses information from the TCP layer, packets can be delivered while the bandwidth control is conducted with a reduced processing load than when packets are directly delivered from transmission session processing unit 121-1-121-N.

Second Embodiment

The configuration of a session relay apparatus according to a second embodiment of the present invention is similar to the configuration of session relay apparatus 1 according to the first embodiment of the present invention illustrated in FIG. 2.

Figure 8:
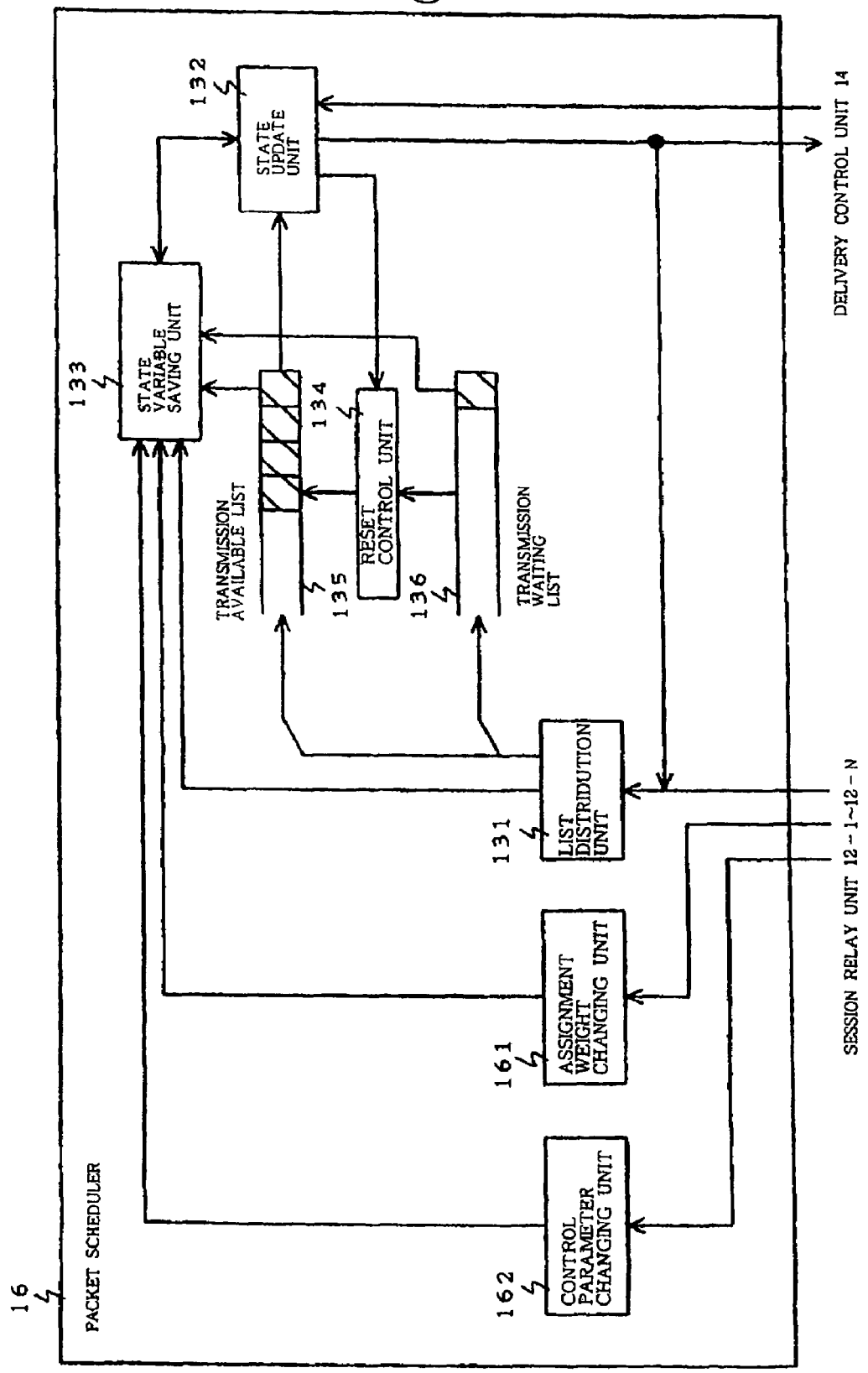
FIG. 8 is a block diagram illustrating the configuration of a packet scheduler according to a second embodiment of the present invention.

FIG. 8 is a block diagram illustrating the configuration of a packet scheduler according to the second embodiment of the present invention. In FIG. 8, packet scheduler 16 according to the second embodiment of the present invention is similar in configuration to the first embodiment of the present invention illustrated in FIG. 3 except for the addition of assignment weight changing unit 161 and control parameter changing unit 162, and the same components are designated the same reference numerals. Also, the operation of the same components is similar to the first embodiment of the present invention.

The operation of packet scheduler 16 according to the second embodiment of the present invention will be described with reference to FIG. 8. Here, a description will be given only of aspects different from packet scheduler 13 according to the first embodiment of the present invention.

In the session relay apparatus according to this embodiment, control parameter changing unit 162 in packet scheduler 16 dynamically changes the value of the TCP control parameter for the session in accordance with a bandwidth which is set as the assignment weight. Specifically, control parameter changing unit 162 determines that the delivery of data is limited by the TCP control when the number of transmissible bytes of the session is not larger than a previously set value that is larger than the assignment weight, and changes the value of the TCP control parameter for the session such that the session can deliver data over a wider bandwidth.

However, when even a change in the TCP control parameter does not result in an increased data output bandwidth of the session, or when retransmission time-out occurs at a certain frequency or higher, the change in the TCP parameter is stopped for preventing a congestion on the network.

Also, when the number of transmissible bytes of the session is smaller than another previously set value, the value of the TCP control parameter for the session is changed in order to reduce the data delivery through the TCP control to a bandwidth based on the assignment weight of packet scheduler 16.

The former case involves an increase in the congestion window by a larger width during non-congestion or a reduction in a congestion window reducing rate during congestion, whereas the latter case involves processing reverse to the former case.

Also, in the session relay apparatus according to this embodiment, weight changing unit 161 in packet scheduler 16 dynamically changes the assignment weight in accordance with a bandwidth currently available for transmission. Specifically, assignment weight changing unit 161 determines that data cannot be delivered in a bandwidth which has been set based on the assignment weight, if the number of transmissible bytes of the session is not larger than the previously set value that is larger than the assignment weight, and temporarily reduces the assignment weight.

Subsequently, when the number of transmissible bytes becomes smaller than the previously set other value, assignment weight changing unit 161 increases the assignment weight in succession to the original value. Also, assignment weight changing unit 161 calculates a bandwidth in which the session can transmit, based on the congestion window for the session notified from session relay unit 12-1-12-N and a measured value of round-trip propagation delay time.

Further, if this calculated value differs from a bandwidth set value based on the assignment weight by a certain threshold or more, assignment weight changing unit 161 temporarily changes the assignment weight such that the bandwidth set value based on the assignment weight is equal to the calculated value mentioned above.

Third Embodiment

Figure 9:
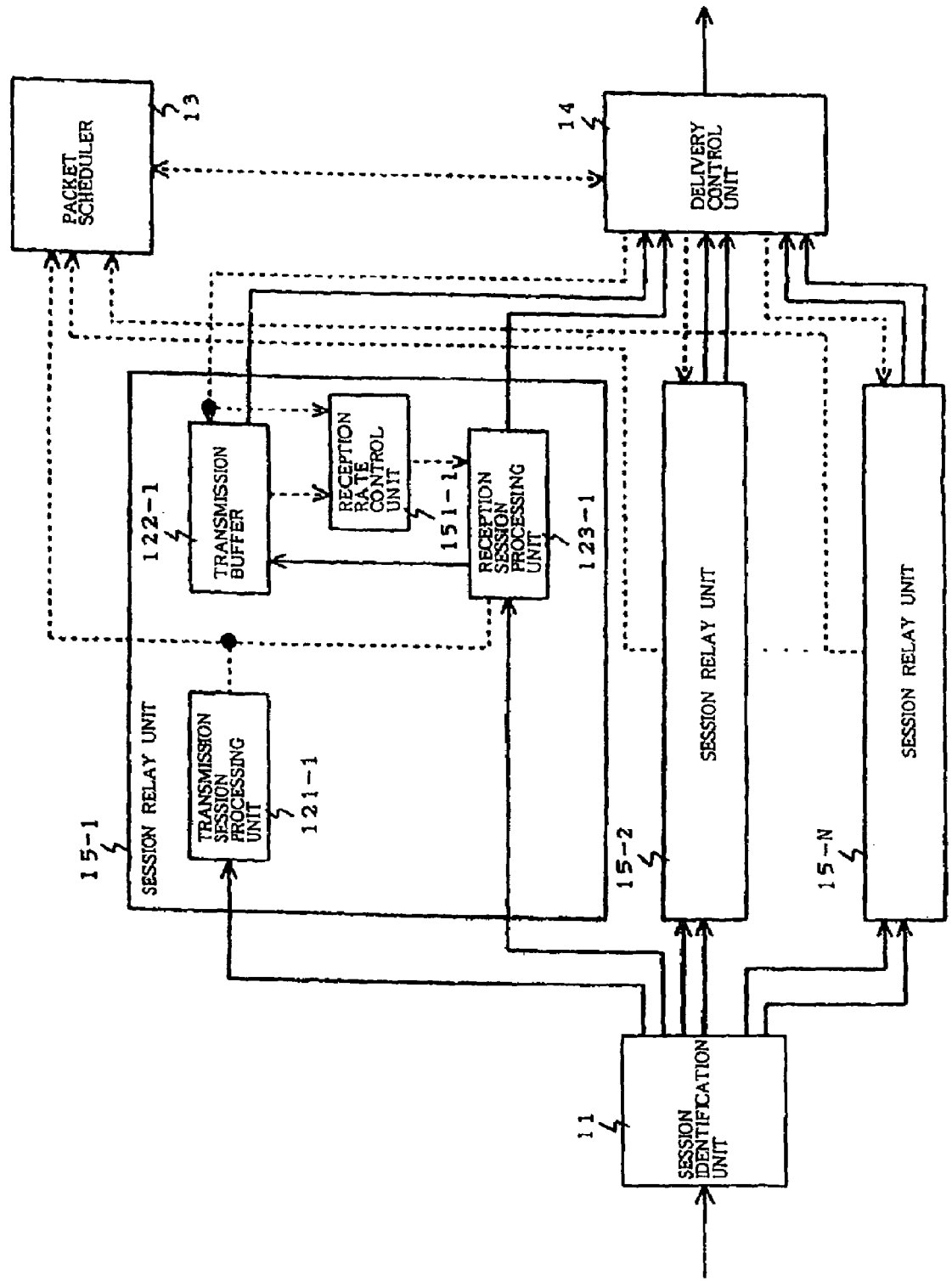
FIG. 9 is a block diagram illustrating the configuration of a session relay apparatus according to a third embodiment of the present invention.

FIG. 9 is a block diagram illustrating the configuration of a session relay apparatus according to a third embodiment of the present invention. In FIG. 9, the session relay apparatus according to the third embodiment of the present invention is similar in configuration to the session relay apparatus according to the first embodiment of the present invention illustrated in FIG. 1, except that reception rate control units 151-1-151-N (reception rate control units 151-2-151-N are not shown) are provided in session relay units 15-1-15-N, and the same components are designated the same reference numerals. Also, the operation of the same components is similar to the first embodiment of the present invention. Reception rate control units 151-1-151-N controls a reception rate from transmission terminal 3.

While the operation of the session relay apparatus according to the third embodiment of the present invention will be described with reference to FIG. 9, description will be herein given only of aspects different from the first embodiment of the present invention described above.

In the session relay apparatus according to this embodiment, when free capacity is exhausted in transmission buffer 122-1-122-N, reception session processing unit 123-1-123-N notifies transmission terminal 3 that the advertisement window size is zero, and transmission terminal 3 stops transmitting data in response thereto.

In the first embodiment of the present invention, even if free capacity is available in transmission buffer 122-1-122-N at a later time, ACK cannot be delivered for resuming the transmission until transmission terminal 3 delivers a packet for a window test.

In this embodiment, on the other hand, when packet scheduler 13 instructs delivery of a packet, reception rate control unit 151-1 tests the free capacity of transmission buffer 122-1-122-N after the packet delivery, and when this is one or MSS or more, an ACK packet is generated for transmission terminal 3 in order to prompt the same for rapid resumption of transmission.

Also, when free capacity or an average thereof increases to a previously set certain value or more in transmission buffer 122-1-122-N, reception rate control unit 151-1-151-N instructs transmission terminal 3 to reduce the transmission bandwidth in order to prevent the exhaustion of the free capacity in transmission buffer 122-1-122-N.

This can be achieved, for example, by replacing an ACK packet returned to the transmission side with a duplicate ACK, discarding received packets, setting an ECN (Explicit Congestion Notification) bit in the ACK packet, delaying the ACK packet, temporarily rewriting the advertisement window of the ACK packet to be small, and the like.

Fourth Embodiment

Figure 10:
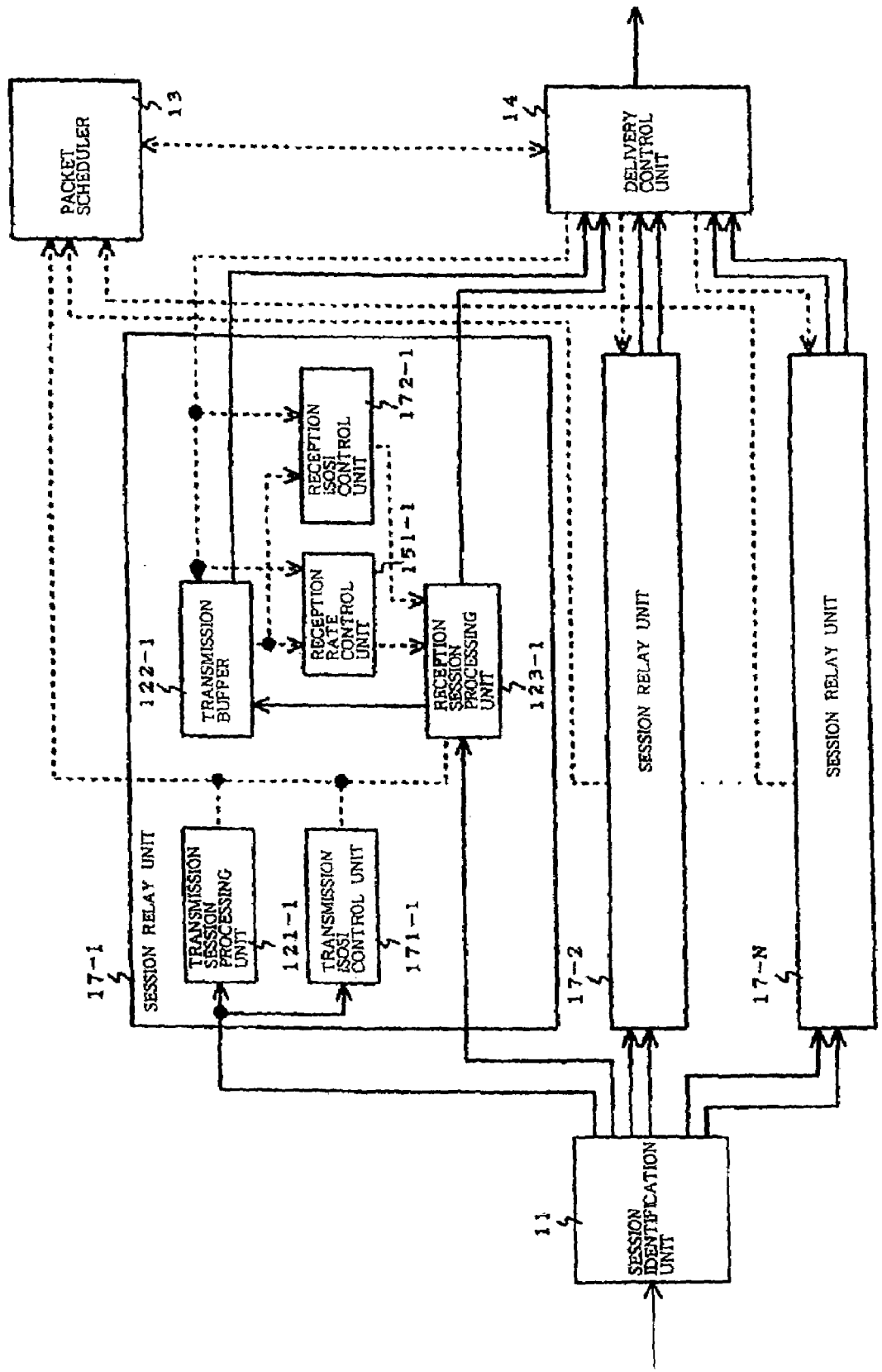
FIG. 10 is a block diagram illustrating the configuration of a session relay apparatus according to a fourth embodiment of the present invention.

FIG. 10 is a block diagram illustrating the configuration of a session relay apparatus according to a fourth embodiment of the present invention. In FIG. 10, the session relay apparatus according to the fourth embodiment of the present invention is similar in configuration to the session relay apparatus according to the third embodiment of the present invention except that session relay units 17-1-17-N are provided with transmission iSCSI (internet Small Computer System Interface) control units 171-1-171-N (transmission iSCSI control units 171-2-171-N are not shown) and reception iSCSI control units 172-1-172-N (reception iSCSI control units 172-2-172-N are not shown), and the same components are designated the same reference numerals. Also, the operation of the same components is similar to the session relay apparatus according to the third embodiment of the present invention.

Transmission iSCSI control unit 171-1-171-N reflects congestion control information for the iSCSI layer to the transmission rate to reception terminal 2. Reception iSCSI control unit 172-1-172-N reflects congestion control information for the iSCSI layer to the reception rate from transmission terminal 3.

The operation of the session relay apparatus according to the fourth embodiment of the present invention will be described with reference to FIG. 10. Here, a description will be given only of different aspects between the fourth embodiment of the present invention and the third embodiment of the present invention.

On the iSCSI layer, an R2T (Ready-To-Transfer) packet is transmitted from reception terminal 2 to transmission terminal 3 for notifying the amount of data which can be received by reception terminal 2 in order to conduct transfer control between transmission terminal 3 and reception terminal 2.

Then, in this embodiment, when transmission iSCSI control unit 171-1-171-N receives the R2T packet from reception terminal 2, this R2T packet is not sent to reception terminal 2, but the sequence number of the last one of data delivered upon receipt of the R2T packet is stored in the session relay apparatus according to this embodiment.

Transmission iSCSI control unit 171-1-171-N adds the amount of transmissible data of the R2T packet received this time to the sequence number stored the last time, and notifies packet scheduler 13 of the sum as the amount of data which can be transmitted on the iSCSI layer.

Figure 11:
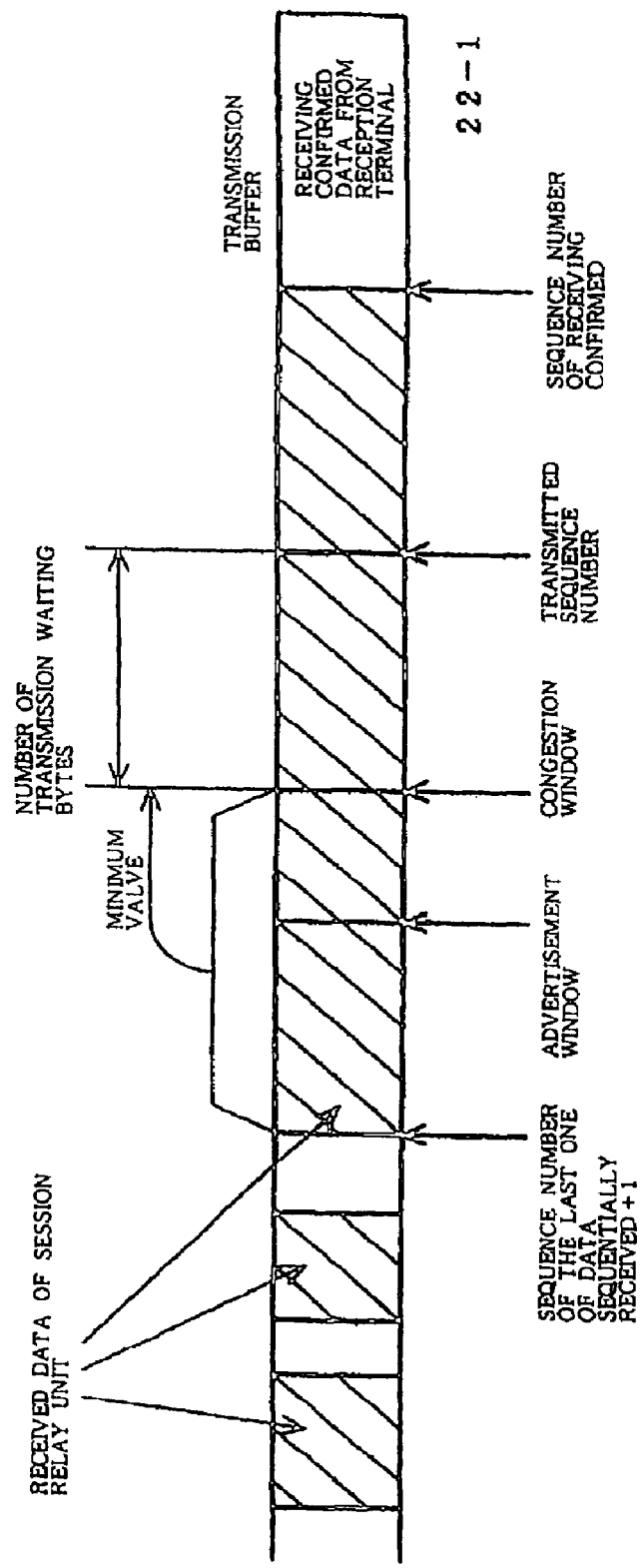
FIG. 11 is a schematic diagram describing the number of transmission waiting bytes in the fourth embodiment of the present invention.

Packet scheduler 13 defines the number of transmission waiting bytes as a minimum value of the amount of data permitted by the TCP layer for transmission and the amount of data permitted by the iSCSI layer. Specifically, as shown in FIG. 11, the number of transmission waiting bytes=min(sequence number of the last unit of sequentially received data+1, advertisement window indicated by reception terminal, congestion window of the session, sequence number when R2T packet was received the last time+the amount of transmissible data of R2T packet received this time)−a transmitted sequence number.

When packet scheduler 13 instructs delivery of a packet, reception iSCSI control unit 172-1-172-N tests transmission buffer 122-1-122-N for a free capacity after the packet delivery, and transmits the free capacity of the transmission buffer to transmission terminal 3 as a R2T packet if this is equal to or more than a previously defined certain value or more than this value.

As described above, congestion control is not conducted for the iSCSI layer between transmission terminal 3 and reception terminal 2, but congestion control for the iSCSI layer is relayed by the session relay apparatus, thereby making it possible to achieve an improvement in the throughput on the iSCSI layer as well, similar to that when a TCP session is relayed.

Fifth Embodiment

Figure 12:
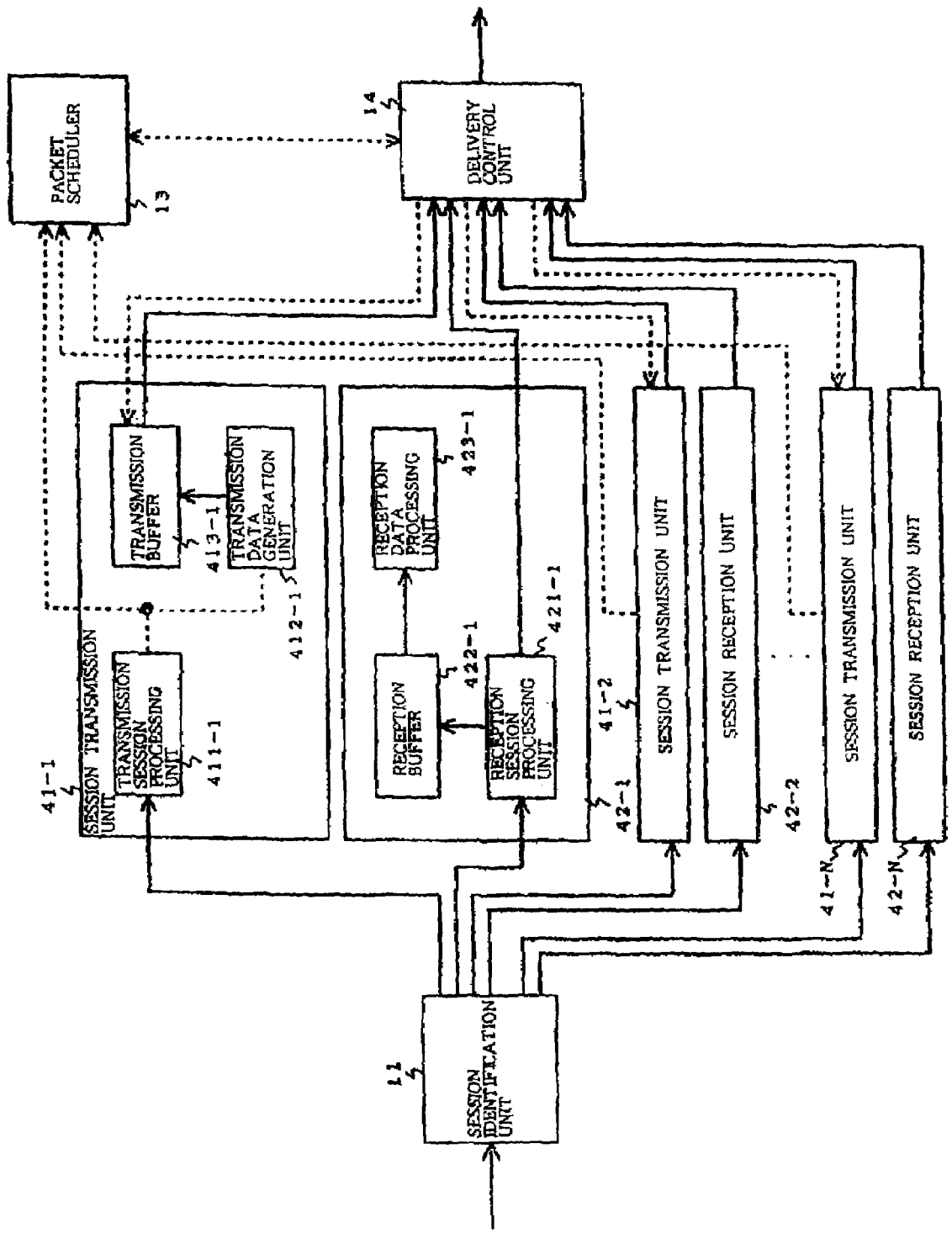
FIG. 12 is a block diagram illustrating the configuration of a session relay apparatus according to a fifth embodiment of the present invention.

FIG. 12 is a block diagram illustrating the configuration of a session relay apparatus according to a fifth embodiment of the present invention. In FIG. 12, the session relay apparatus according to the fifth embodiment of the present invention comprises session identification unit 11, session transmission units 41-1-41-N, session reception units 42-1-42-N, packet scheduler 13, and delivery control unit 14.

Session identification unit 11 determines a session to which an incoming packet belongs, session transmission unit 41-1-41-N performs transmission processing for data in a session to a reception terminal, and session reception unit 42-1-42-N performs reception processing for data from a session to the reception terminal.

Packet scheduler 13 controls the delivery of packets from each session transmission unit 41-1-41-N. Delivery control unit 14 delivers packets from each session transmission unit 41-1-41-N based on instructions from packet scheduler 13.

Session transmission units 41-1-41-N comprise transmission session processing units 411-1-411-N (transmission session processing units 411-2-411-N are not shown), transmission data generation units 412-1-412-N (transmission data generation units 412-2-412-N are not shown), and transmission buffers 413-1-413-N (transmission buffers 413-2-413-N are not shown).

Transmission data generation unit 413-1-413-N stores transmission data from an application program in transmission buffer 413-1-413-N. Transmission buffer 5-6-1 temporarily stores data to be transmitted. Transmission session processing unit 411-1-411-N processes a session for transmitting data to the reception terminal.

Session reception units 42-1-42-N comprise reception session processing units 421-1-421-N (reception session processing units 421-2-421-N are not shown), reception buffers 422-1-422-N (reception buffers 422-2-422-N are not shown), and received data processing units 423-1-423-N.

Reception session processing unit 421-1-421-N perform reception processing for data from the reception terminal, while reception buffer 422-1-422-N temporarily store received data. Received data processing unit 423-1-423-N pass received data from reception buffer 5-14-1 to an application.

Generally, since bidirectional communications are made between a transmission terminal and a reception terminal in a TCP session, one of session transmission units 41-1-41-N and one of session reception units 42-1-42-N are used for the set of a transmission terminal and a reception terminal. In this embodiment, the session relay apparatus additionally serves as a transmission terminal or a reception terminal.

Figure 13:
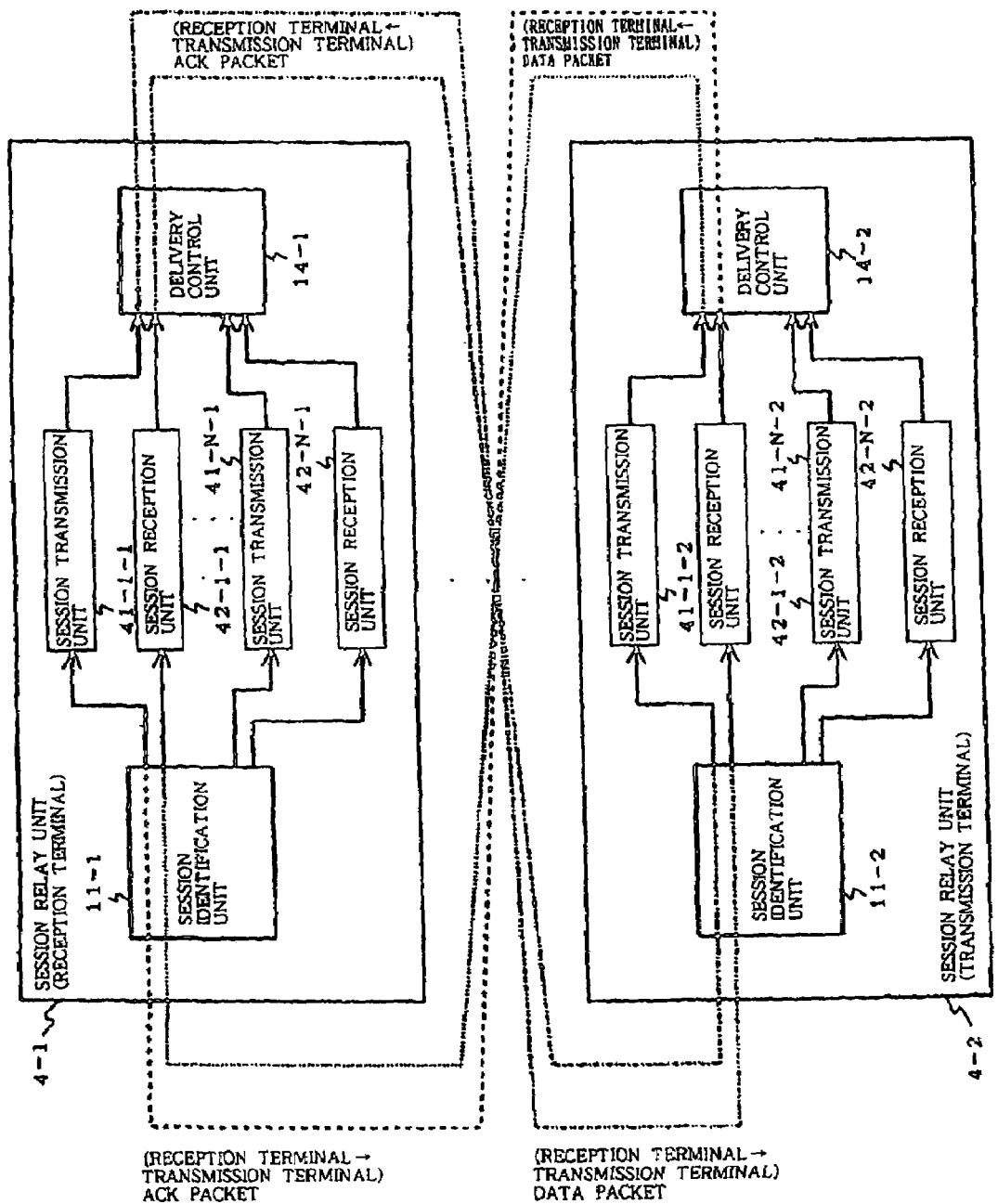
FIG. 13 is a block diagram illustrating a flow of data between the session relay apparatus (transmission terminal) and the session relay apparatus (reception terminal) according to the fifth embodiment of the present invention.

FIG. 13 is a block diagram illustrating the flow of data between the session relay apparatus (transmission terminal) and session relay apparatus (reception terminal) according to the fifth embodiment of the present invention. In FIG. 13, when data is transmitted from session relay apparatus (transmission terminal) 4-2 to session relay apparatus (reception terminal) 4-1, a data packet delivered from session transmission unit 41-1-2 of session relay apparatus (transmission terminal 4-2) undergoes reception processing in session reception unit 42-1-1 of session relay apparatus (reception terminal) 4-1. As a result, the generated ACK packet is returned to session transmission unit 41-1-2 of session relay apparatus (transmission terminal) 4-2.

On the other hand, when data is sent from session relay apparatus (reception terminal) 4-1 to session relay apparatus (transmission terminal) 4-2, the data packet delivered from session transmission unit 41-1-1 in session relay apparatus (reception terminal) 4-1 undergoes reception processing in session reception unit 42-1-2 of session relay apparatus (transmission terminal) 4-2. As a result, the generated ACK packet is returned to session transmission unit 41-1-1 of session relay apparatus (reception terminal) 4-1.

Next, the operation of the fifth embodiment of the present invention will be described with reference to FIG. 12. First, a description will be given of data transfer from the transmission terminal to the reception terminal.

Transmission data generated by an application program is written into transmission buffer 413-1-413-N by transmission data generation unit 412-1-412-N. Transmission session processing unit 411-1-411-N processes data which has been transmitted from transmission buffer 413-1-413-N to the reception terminal. Since this processing is similar to the aforementioned first embodiment of the present invention, a description thereon is omitted.

Here, for calculating the number of transmission waiting bytes, packet scheduler 13 employs the sequence number of the last unit of data received from the application program instead of the sequence number of the last one of sequentially received data.

Next, description will be given of data transfer from the reception terminal to the transmission terminal. Reception session processing unit 421-1-42-1N performs reception processing for data transmitted from the reception terminal, and stores data which can be correctly received in transmission buffer 422-1-422-N.

This reception processing is similar to the aforementioned first embodiment of the present invention except that the data is stored in the reception buffer instead of in the transmission buffer, so that a description thereon is omitted. The data written into reception buffer 422-1-422-N is retrieved by reception data processing unit 423-1-423-N, and passed to the application program.

Thus, in the present invention, the creation of congestion control information alone is performed on each of a plurality of layers in regard to congestion control processing for the layers, and packet delivery control processing is concentrated in a scheduler on the IP layer, thereby making it possible to realize session relay processing at higher speeds.

Also, the present invention can realize the session relay processing at higher speeds by concentrating reception buffers and transmission buffers for a plurality of layers in the transmission buffer for the IP layer to eliminate data movements between buffers.

The invention claimed is:

1. A session relay apparatus for realizing communication between a reception terminal and a transmission terminal by relaying data via a session, the apparatus comprising:
    a session relay unit, corresponding to the session, comprising:
    reception session processing means for receiving data from the transmission terminal,
    transmission buffering means for temporarily storing the data received from the transmission terminal in a transmission buffer,
    transmission session processing means for receiving data from the reception terminal, wherein the transmission session processing means calculates an amount of transmissible data based on the data received from the reception terminal,
    packet scheduling means for controlling delivery of the data stored in the transmission buffer, based on the amount of transmissible data,
    delivery control means for delivering the data stored in the transmission buffer in response to the control of the packet scheduling means,
    wherein the session relay apparatus comprises a plurality of session relay units, and
    wherein said packet scheduling means determines a session relay unit from the plurality of session relay units from which to deliver a packet, based on a communication resource allocation policy including at least:
        a bandwidth and a bandwidth ratio allocated to the session corresponding to the determined session relay unit,
        the amount of data that is permitted to be delivered (transmissible data) calculated by the transmission session processing means, and
        an amount of data stored in the transmission buffer.

2. A session relay apparatus for realizing communication between a reception terminal and a transmission terminal by relaying data via a session, the apparatus comprising:
    a session relay unit, corresponding to the session, comprising:
    reception session processing means for receiving data from the transmission terminal,
    transmission buffering means for temporarily storing the data received from the transmission terminal in a transmission buffer,
    transmission session processing means for receiving data from the reception terminal,
    wherein the transmission session processing means calculates an amount of transmissible data based on the data received from the reception terminal,
    packet scheduling means for controlling delivery of the data stored in the transmission buffer, based on the amount of transmissible data,
    delivery control means for delivering the data stored in the transmission buffer in response to the control of the packet scheduling means,
    further comprising means for dynamically changing a control parameter of the session, wherein the control parameter is changed in accordance with a data delivery situation from said packet scheduler,
    wherein the control parameter of the session is changed in a direction in which an output bandwidth from the session decreases when a free bandwidth of the session increases,
    the control parameter of the session is changed in a direction in which the output bandwidth from the session increases when the free bandwidth of the session decreases, and
    the change of the control parameter is stopped when congestion is caused by a change in the control parameter.

3. The session relay apparatus according to claim 2, further comprising means for dynamically changing an amount of allocated communication resources including at least a bandwidth and a bandwidth ratio allocated to the session,
    wherein the control parameter is changed in accordance with a data delivery situation from the packet scheduler and an amount of data available for communication notified from the delivery control means.

4. The session relay apparatus according to claim 3, wherein resources allocated to the session are reduced when free bandwidth of the session increases, the resources allocated to the session are increased with its initial value defined as an upper limit when the free bandwidth of the session decreases, and the allocated resources are increased or decreased in accordance with the amount of transmissible data notified from said delivery control means or an average thereof.

5. A session relay apparatus for realizing communication between a reception terminal and a transmission terminal by relaying data via a session, the apparatus comprising:
    a session relay unit, corresponding to the session, comprising:
    reception session processing means for receiving data from the transmission terminal,
    transmission buffering means for temporarily storing the data received from the transmission terminal in a transmission buffer, transmission session processing means for receiving data from the reception terminal, wherein the transmission session processing means calculates an amount of transmissible data based on the data received from the reception terminal, packet scheduling means for controlling delivery of the data stored in the transmission buffer, based on the amount of transmissible data, delivery control means for delivering the data stored in the transmission buffer in response to the control of the packet scheduling means, and including transmission rate control means for controlling transmission control information including at least a bandwidth, availability of transmission, and the amount of data amount of data that is permitted to be delivered, wherein the transmission control information is changed or generated in accordance with a free capacity of the transmission buffer and information from said packet scheduler.

6. The session relay apparatus according to claim 5, further comprising means for receiving packet delivery information from the packet scheduler, and means for checking the transmission buffer for a free capacity changed by a delivered packet, wherein a dispatch confirmation packet is transmitted to the transmission terminal to prompt the same to resume a transmission when the free capacity of the transmission buffer increases to a certain amount or more after a packet has been delivered.

7. The session relay apparatus according to claim 5, further comprising means for examining at least one of a free capacity of the transmission buffer and an average thereof, wherein the transmission terminal is instructed to reduce a transmission bandwidth in accordance with the free capacity.

8. A session relaying method for a session relay apparatus for realizing a communication between a reception terminal and a transmission terminal by relaying data via a session from a plurality of sessions, the method comprising:

receiving data from the transmission terminal;

temporarily storing the data received from the transmission terminal in a transmission receiving data from the reception terminal, wherein an amount of transmissible data is calculated based on the data received from the reception terminal;

controlling delivery of the data stored in the transmission buffer based on the amount of transmissible data;

delivering the data stored in the transmission buffer in accordance with the controlling of the delivery; and further comprising:

determining a session from the plurality of sessions for which to deliver a packet based on a communication resource allocation policy including at least:

a bandwidth and a bandwidth ratio allocated to the determined session, the amount of transmissible data, and an amount of data stored in the transmission buffer.

9. A session relaying method for a session relay apparatus for realizing a communication between a reception terminal and a transmission terminal by relaying data via a session from a plurality of sessions, the method comprising:

receiving data from the transmission terminal:

temporarily storing the data received from the transmission terminal in a transmission buffer;

receiving data from the reception terminal, wherein an amount of transmissible data is calculated based on the data received from the reception terminal;

controlling delivery of the data stored in the transmission buffer based on the amount of transmissible data;

delivering the data stored in the transmission buffer in accordance with the controlling of the delivery; and further comprising:

dynamically changing a control parameter of the session in accordance with a data delivery situation and further comprising:

dynamically changing the control parameter of the session in a direction in which an output bandwidth from the session decreases, if a free bandwidth of the session increases, dynamically changing the control parameter of the session in a direction in which the output bandwidth from the session increases, if the free bandwidth of the session decreases, and stopping the dynamic change of the control parameter when a congestion is caused by a change in the control parameter.

10. The session relaying method according to claim 9, further comprising:

dynamically changing the control parameter in accordance with a data delivery situation and the amount of transmissible data by means for dynamically changing an amount of allocated communication resources including at least a bandwidth and a bandwidth ratio allocated to each session of the plurality of sessions.

11. The session relaying method according to claim 10, further comprising:

reducing resources allocated to the session if the free bandwidth of the session increases, increasing resources allocated to the session with its initial value defined as an upper limit if the free bandwidth of the session decreases, and increasing or decreasing the allocated resources in accordance with the amount of transmissible data or an average thereof.

12. The session relaying method according to any of claims 8, 9 and 10, further comprising:

changing or generating the transmission control information to said transmission terminal in accordance with the free capacity of said transmission buffer and information from said packet scheduler by transmission rate control means for controlling transmission control information including at least a bandwidth, availability of transmission, and the amount of transmissible data for controlling transmission processing for a session from said transmission terminal.

13. The session relaying method according to claim 12, further comprising:

transmitting a dispatch confirmation packet to the transmission terminal to prompt the same to resume a transmission when the free capacity of the transmission buffer increases to a certain amount or more after a packet has been delivered.

14. The session relaying method according to claim 12, further comprising:

instructing said transmission terminal to reduce a transmission bandwidth in accordance with a free capacity examined by means for examining at least one of the free capacity of the transmission buffer and an average thereof.

* * * * *